United States Patent
Knight et al.

(10) Patent No.: US 12,521,688 B2
(45) Date of Patent: Jan. 13, 2026

(54) MIXING CURRENT INTERFACE FOR A POLYMERIZATION ZONE IN AN AUTOCLAVE REACTOR

(71) Applicant: Chevron Phillips Chemical Company LP, The Woodlands, TX (US)

(72) Inventors: Corey W. Knight, Houston, TX (US); Kenneth A. Dooley, Porter, TX (US); Ralph J. Price, Porter, TX (US); Richard A. Hernandez, Spring, TX (US); Benjamin M. Shaw, Houston, TX (US); Joe R. Trevino, Seabrook, TX (US); Trevor Hilderman, Burnaby (CA)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 477 days.

(21) Appl. No.: 18/194,897

(22) Filed: Apr. 3, 2023

(65) Prior Publication Data
US 2024/0326007 A1    Oct. 3, 2024

(51) Int. Cl.
*B01J 19/18*    (2006.01)
*B01J 3/04*    (2006.01)
*B01J 19/00*    (2006.01)

(52) U.S. Cl.
CPC ............... *B01J 19/18* (2013.01); *B01J 3/04* (2013.01); *B01J 19/006* (2013.01); *B01J 19/0066* (2013.01); *B01J 2219/00779* (2013.01)

(58) Field of Classification Search
CPC ........ B01J 3/04; B01J 19/006; B01J 19/0066; B01J 2219/00779; B01J 19/1806; B01J 19/18
See application file for complete search history.

(56) References Cited

U.S. PATENT DOCUMENTS

| | | |
|---|---|---|
| 2,053,876 A | 9/1936 | Pfau |
| 3,756,996 A | 9/1973 | Pugh |
| 3,963,690 A | 6/1976 | Pruitt |
| 4,200,614 A | 4/1980 | Colburn |
| 6,428,199 B1 | 8/2002 | Rupaner |

FOREIGN PATENT DOCUMENTS

| | | | | |
|---|---|---|---|---|
| EP | 3741455 A1 | 11/2020 | | |
| GB | 1276917 A | * 6/1972 | ............. | B01J 19/18 |
| WO | 2018076062 A1 | 5/2018 | | |
| WO | 2021154474 A1 | 8/2021 | | |

* cited by examiner

*Primary Examiner* — Catherine S Branch
(74) *Attorney, Agent, or Firm* — Scheef & Stone, L.L.P.; Keith C . . Rawlins, Esq.

(57) ABSTRACT

Disclosed are a process and autoclave reactor configured to create, in a polymerization zone of the autoclave reactor, a first mixing current, a second mixing current, and an interface located between the first mixing current and the second mixing current, wherein the interface is offset from a reaction component inlet of the autoclave reactor that introduces a reaction component stream into the polymerization zone.

20 Claims, 5 Drawing Sheets

MIXING CURRENT INTERFACE FOR A POLYMERIZATION ZONE IN AN AUTOCLAVE REACTOR

FIELD OF THE DISCLOSURE

The present disclosure generally relates to autoclave reactors for polyolefin production, and more particularly to mixing of a reaction medium in a polymerization zone of autoclave reactors.

BACKGROUND

Polyolefins such as polyethylene, polypropylene, and their copolymers, are widely used for piping, retail and pharmaceutical packaging, food and beverage packaging, plastic bags, toys, carpeting, various industrial products, automobile components, appliances and other household items, and so forth. Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such as thermal stability, molecular weight, and chemical reactivity, typically determine what type of polyolefin is suitable.

To satisfy this demand, various processes exist by which olefins may be polymerized to form polyolefins. One such process is autoclave polymerization of ethylene under high pressures and temperatures. A challenge associated with autoclave polymerization is that some of the ethylene can decompose in the reactor. There is a need to reduce ethylene decomposition in autoclave polymerization.

SUMMARY

In some aspects, the techniques described herein relate to a process including: mixing a reaction medium in an autoclave reactor with a rotating shaft, wherein the rotating shaft has a first baffle and a second baffle coupled to the rotating shaft, wherein a volume of the autoclave reactor that is between the first baffle and the second baffle forms a polymerization zone, wherein each of a first plurality of paddles is connected to the first baffle, wherein each of a second plurality of paddles is connected to the second baffle; during mixing, creating in the polymerization zone a first mixing current, a second mixing current, and an interface located between the first mixing current and the second mixing current; and introducing a reaction component into the polymerization zone via an inlet of the autoclave reactor that is fluidly coupled to the polymerization zone, wherein the interface is offset from the inlet.

In some aspects, the techniques described herein relate to an autoclave reactor including: a housing having a first inlet configured to receive an olefin monomer, a second inlet configured to receive an initiator, and an outlet configured to output a reaction medium including a polyolefin; and an agitator assembly contained within the housing, wherein the agitator assembly includes: a motor; a shaft coupled to the motor; a first baffle coupled to the shaft; a second baffle coupled to the shaft below the first baffle so as to form a polymerization zone between the first baffle and the second baffle; a first plurality of paddles connected to the first baffle; and a second plurality of paddles connected to the second baffle, wherein a first group of the second plurality of paddles is positioned on a first side of the second baffle; wherein the second inlet is positioned on a side of the housing and has a feed point to the polymerization zone that is between the first baffle and the second baffle.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The disclosed processes and autoclave reactors utilize configurations of the baffles and paddles coupled to a rotating shaft that mix a reaction medium to create mixing currents in a given polymerization zone. The disclosed configurations of the paddles on the baffles controls the location of an interface between the mixing currents created in a given polymerization zone, which can improve mixing of the reaction components in the polymerization zone. The disclosed autoclave reactors generally have a series of polymerization zones. The autoclave reactors include a shaft, baffles coupled to the shaft, and paddles coupled to each baffle; and the volume between each pair of baffles defines a polymerization zone. Rotation of the shaft causes rotation of the baffles and paddles, and the configurations herein create the mixing currents within a given polymerization zone that improve mixing of reaction components in the polymerization zone. The improved mixing achieved by the disclosed processes and autoclave reactor configurations can reduce olefin monomer decomposition, and in particular, ethylene decomposition when ethylene is used as the olefin monomer.

Figure 1:
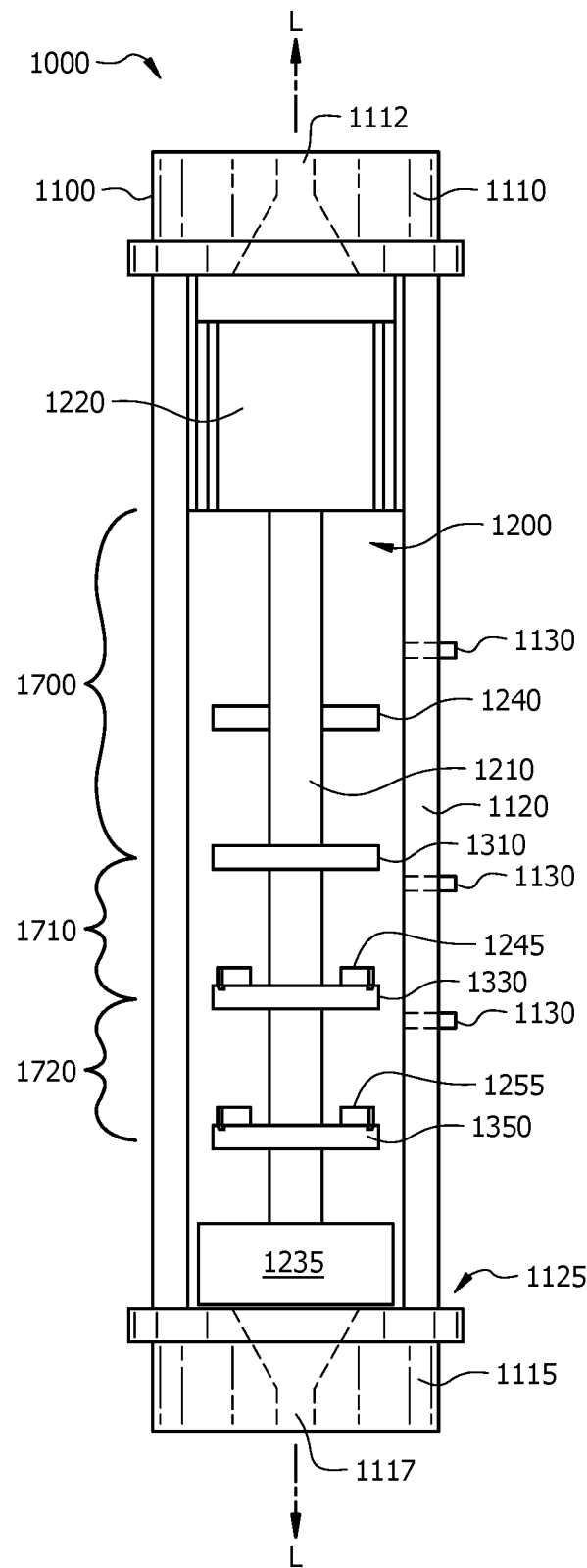
FIG. 1 illustrates a schematic side view of the inside of an autoclave reactor.

FIG. 1 illustrates a side view of the inside of an autoclave reactor 1000. The autoclave reactor 1000 includes a housing 1100 and an agitator assembly 1200 contained within the housing 1100.

The housing 1100 can have a top piece 1110, a bottom piece 1115, and a vessel body 1120 connected between the top piece 1110 and the bottom piece 1115. The housing 1100 can include a reactor inlet 1112 formed in the top piece 1110 and a reactor outlet 1117 formed in the bottom piece 1115. The reactor inlet 1112 is configured to receive an olefin monomer and optionally any other reaction component disclosed herein. The reactor outlet 1117 is configured to output a reaction medium comprising a polyolefin.

The housing 1100 can additionally include one or more reaction component inlets 1130 formed in the vessel body 1120 on the side of the autoclave reactor 1000. The one or more reaction component inlets 1130 are configured to receive one or more reaction components described herein for direct introduction of the one or more reaction components to a polymerization zone. For example, the reaction component inlets 1130 can be located on the vessel body 1120 so that the one or more reaction components (e.g., olefin monomer, olefin comonomer, diluent, initiator, or combinations thereof) can be introduced directly into a polymerization zone. In some aspects, a reaction component inlet 1130 can be a catalyst inlet that is configured to introduce an initiator (e.g., a gas-phase initiator) and includes a quill. In several aspects, a gas-phase initiator can flow through the middle of the quill and another reaction component (e.g., an olefin monomer) can flow through an annular space between the quill and a wall of the autoclave reactor 1000.

The top piece 1110, bottom piece 1115, and the vessel body 1120 of the housing 1100 can form a cylindrical housing. The ratio of an inside length of the housing 1100 to an inner diameter of the housing 1100 can range from about 10 to about 12.

The terms "above" and "below," as used herein, refer to directions toward the top piece 1110 and the bottom piece 1115, respectively. Likewise, the terms "upstream" and "downstream," as used herein, refer to directions toward the top piece 1110 and the bottom piece 1115, respectively.

Reaction components can enter an interior of the housing 1100 via the reactor inlet 1112 and the reaction component inlets 1130. The reaction components react in the housing 1100 to form a polymer product comprising a polyolefin in a reaction medium comprising an olefin monomer, a comonomer, a diluent, a catalyst (e.g., catalyst system comprising catalyst and co-catalyst), and the polymer product (e.g., LDPE). The reaction medium moves from the top piece 1110 to the bottom piece 1115 of the housing 1100 while being mixed by a rotation of a shaft 1210 of an agitator assembly 1200.

The agitator assembly 1200 can be contained within the housing 1100 for mixing the reaction medium within the interior of the housing 1100. The agitator assembly 1200 can include the shaft 1210 and a motor 1220 coupled to the shaft 1210, for rotating the shaft 1210.

In some aspects, the motor 1220 is free-floating in the housing 1100, in that, the agitator assembly 1200 (e.g., the motor 1220) is not connected to the top piece 1110 of the housing 1100, or is not connected to the vessel body 1120 of the housing 1100, or is not connected to both the top piece 1110 and the vessel body 1120 of the housing 1100. In these aspects, a bearing 1235 supports the entire weight of the agitator assembly 1200. The bearing 1235 is shown at a bottom portion 1125 of the vessel body 1120, resting on the bottom piece 1115 of the housing 1100. The motor 1220 causes the shaft 1210 to rotate along the longitudinal axis L of the autoclave reactor 1000, which is also the longitudinal axis for the bearing 1235.

Alternatively, the motor 1220 or a top end of the shaft 1210 that extends above the motor 1220 can be connected (e.g., via other bearings) to the top piece 1110 of the housing 1100, or to the vessel body 1120 of the housing 1100, or to both the top piece 1110 and the vessel body 1120 of the housing 1100. In these aspects, the bearing 1235 supports less than all the weight of the agitator assembly 1200.

Alternatively, the motor 1220 can be located externally of the housing 1100 and can be connected (e.g., via other bearings) to the top piece 1110 of the housing 1100. In these aspects, the bearing 1235 supports less than all the weight of the agitator assembly 1200 since the motor 1220 rests on the top piece 1110.

The agitator assembly 1200 can include one or more axial paddles 1240 and at least two baffles (e.g., illustrated as an upper baffle 1310, a lower baffle 1330, and a bottom baffle 1350 in FIG. 1) coupled to the shaft 1210. The placement of the baffles on the shaft 1210 can define polymerization zones, e.g., baffles 1310, 1330, and 1350 help define polymerization zones 1700, 1710, and 1720 in the autoclave reactor 1000 of FIG. 1. The polymerization zone 1700 can extend between the motor 1220 and the upper baffle 1310, the polymerization zone 1710 can extend between the upper baffle 1310 and lower baffle 1330, and the polymerization zone 1720 can extend between the lower baffle 1330 and the bottom baffle 1350. Having multiple polymerization zones 1700, 1710, and 1720 in series can achieve higher conversion rates compared with an autoclave reactor having fewer or one polymerization zone(s). In aspects, the polymerization zone 1700 can make up 30% to 50% of the total volume of the autoclave reactor 1000.

Each axial paddle 1240 extends radially outwardly from the shaft 1210. Each axial paddle 1240 can have any configuration and shape known in the art with the aid of this disclosure, and each of the axial paddles 1240 has a surface area for moving, mixing, and agitating the reaction medium within the polymerization zone 1700. In some aspects, one or more of the axial paddles 1240 can be disposed along other positions of the shaft such as in one or more of the polymerization zones. In some aspects, the shaft 1210 can be connected to one or more axial paddles 1240, for example, from 2 to 12 axial paddles 1240, such as 4 to 8 axial paddles. The shaft 1210 can be coupled to the upper baffle 1310, the lower baffle 1330, and the bottom baffle 1350.

Regarding the baffles illustrated in FIG. 1, the upper baffle 1310 is located below axial paddles 1240 and above the lower baffle 1330, and the bottom baffle 1350 is located below the lower baffle 1330. Each of the baffles 1310, 1330, and 1350 has paddles connected thereto. First, each of the baffles 1310, 1330, and 1350 has bottom-side paddles connected to a bottom side of the respective baffle 1310, 1330, and 1350 (which are not visible in FIG. 1 because the paddles are contained within a side wall of each baffle 1310, 1330, and 1350. Second, the lower baffle 1330 includes top-side paddles 1245 connected to a top side of the lower baffle 1330, and the bottom baffle 1350 includes top-side paddles 1255 connected to a top side of the bottom baffle 1350.

The bottom-side paddles of upper baffle 1310 and the top-side paddles 1245 of lower baffle 1330 have a surface area for moving, mixing, and agitating the reaction medium within the polymerization zone 1710. The bottom-side paddles of lower baffle 1330 and the top-side paddles 1245 of bottom baffle 1350 have a surface area for moving, mixing, and agitating the reaction medium within the polymerization zone 1720.

For aspects that include more lower baffles than illustrated in FIG. 1, the one or more additional lower baffles can be connected to the shaft 1210 below the upper baffle 1310 and above the bottom baffle 1350. The one or more additional lower baffles can include all features of the lower baffle 1330 as described herein.

The reaction components introduced to the autoclave reactor 1000 via the inlets 1112 and 1130 can include an olefin monomer and optionally a comonomer.

Examples of suitable olefin monomers include ethylene, propylene, 1-butene, or combinations thereof.

Examples of suitable comonomers include $C_3$-$C_{20}$ olefins; alternatively, $C_3$-$C_{12}$ olefins. The comonomer can be linear or branched, and two or more comonomers can be used. Examples of suitable comonomers include linear $C_3$-$C_{12}$ olefins and olefins having one or more $C_1$-$C_8$ alkyl branches or an aryl group. Specific examples include, but are not limited to, propylene; 1-butene; 3-methyl-1-butene; 3,3-dimethyl-1-butene; 1-pentene; 1-pentene with one or more methyl, ethyl, or propyl substituents; 1-hexene with one or more methyl, ethyl, or propyl substituents; 1-heptene with one or more methyl, ethyl, or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; styrene; or flow-throughs thereof.

The LDPE polymer or copolymer can be produced using a high pressure and high temperature polymerization process. Various process variations that achieve safe and economical operating conditions are known in the art. By way of example, the polymerization process can be performed at a pressure of about 1,310 bar to about 3,100 bar and a temperature of about 148° C. to about 260° C. when a single autoclave reactor is used.

The polymerization reaction can be enhanced or initiated by the injection of at least one reaction component. Specific examples of the reaction component include, but are not limited to, a solvent, an initiator, a chain transfer agent, or combinations thereof.

Suitable solvents can be or can include one or more linear or branched $C_4$ to $C_7$ alkanes, such as butane, pentane, hexane, iso-butane, iso-pentane, iso-hexane, or mixtures thereof.

Suitable initiators used to produce LDPE or LDPE copolymers in embodiments of the present disclosure may include an organic peroxide, such as dialkyl peroxides, diacyl peroxides, peroxyesters, peroxyketals, peroxydicarbonates, or combinations thereof. Examples of dialkyl peroxides suitable for use as free radical initiators include, but are not limited to, di-tertiary butyl peroxide, di-tertiary amyl peroxide, and the like, or combinations thereof. An example of diacyl peroxides suitable for use as free radical initiators includes, but is not limited to, di-3,5,5-trimethyl hexanoyl peroxide (or di-isononanoyl peroxide). Examples of peroxyesters suitable for use as free radical initiators include, but are not limited to tertiary-butyl peroxyacetate, tertiary-butyl peroxypivalate, tertiary-butyl peroxy-2-ethylhexanoate, tertiary-butyl peroxyneodecanoate, tertiary-butyl peroxyneoheptanoate, tertiary-butyl peroxybenzoate, tertiary-amyl peroxyacetate, tertiary-amyl peroxypivalate, tertiary-amyl peroxy-2-ethylhexanoate, tertiary-amyl peroxyneodecanoate, tertiary-amyl peroxyneoheptanoate, tertiary-amyl peroxybenzoate, and the like, or combinations thereof. Examples of peroxyketals suitable for use as free radical initiators include, but are not limited to, 2,2-di(tertiary-butyl peroxy) butane, 2,2-di(tertiary-amyl peroxy) butane, and the like, or combinations thereof. Examples of peroxydicarbonates suitable for use as free radical initiators include diisopropyl peroxydicarbonate, di-n-propyl peroxydicarbonate, di-secondary-butyl peroxydicarbonate, di-n-butyl peroxydicarbonate, bis(2-ethyl-hexyl) peroxydicarbonate, and the like, or combinations thereof.

In some aspects, air is suitable for use as a free radical initiator. Air may be suitable for use as a free radical initiator in both autoclave and tubular reactors, although its use in autoclave reactors has generally been discontinued due to a perceived higher reactor decomposition rate in autoclave reactors utilizing air as an initiator.

Suitable chain transfer agents can be chosen from one or more of alkanes, alkenes, aldehydes, ketones, thiols, halocarbons, carbon tetrachloride, or mixtures thereof. Typical chain transfer agents used in the art include propane, butane, hexane, propylene, butene, hexene, acetaldehyde, propionaldehyde, and odorless mineral spirits. In some embodiments, the same or different chain transfer agents can be added to different zones within a single reactor or to different reactors to provide additional control over the molecular weight distribution of the final product. The chain transfer agents may be independently controlled in each zone or each reactor to control the rate of chain transfer in each zone or reactor independently to achieve the desired polymer properties. The use of chain transfer agents with high reactivities can be especially useful in different embodiments for providing independent control of the molecular weight of the polymers produced in each of the reactors.

The residence time in a single autoclave reactor 1000 can range from about 15 to about 60 seconds. The reactor can be operated adiabatically such that the heat of reaction is removed by the fresh ethylene entering the reactor. The conversion rate is related, therefore, to the difference in temperature between the feed and the reactor temperature. The main feature of the LDPE polymer or copolymer produced from a single autoclave process is a broader molecular-weight distribution, which gives excellent properties for shrink-films and heavy duty packaging.

In aspects, multiple reactors having the configuration of the autoclave reactor 1000 in FIG. 1 can be arrange in series for polymerization of an olefin to produce a polyolefin. By feeding fresh ethylene into the line between the reactors and/or removing heat by means of coolers, the conversion rate can be increased. When initiators of different activity are used in the different reactors, the reactors can be run at different temperatures. Also, the split of the feed of fresh ethylene can be varied. Compared to the single reactor process, the cascade arrangement gives more flexibility to adjust the properties of product polymer.

The multi-zone autoclave reactor can be operated with a temperature profile. The temperature in the top chamber can be moderately high, e.g., in the range of about 165° C. to about 200° C. The temperature in the bottom zone can be even higher, e.g., in the range of about 280° C. to about 290° C., to adjust the density of the polymer. Through the temperature profile, which is controlled by the initiator feed and the split of fresh ethylene, the properties of the polymers can be varied. Different peroxides can be used as initiators when the zones are operated at different temperatures.

In several aspects, the shaft 1210 has a circular cross-section; however, it is contemplated that the shaft 1210 can have other cross-sectional shapes, for example, a tri-blade cross-section. In aspects, the shaft 1210 can have a diameter that is in a range of from about 2 in to about 12 in (5.08 cm to 30.48 cm); alternatively, from 5 in to 11 in (12.7 cm to 28.0 cm); alternatively, from 7.5 in to 9.5 in (19.05 cm to 24.13 cm).

In several aspects, each of the upper baffle 1310, the lower baffle 1330, and the bottom baffle 1350 has a diameter that is in a range of from about 20 in to about 30 in (50.8 cm to 76.2 cm); alternatively, from 22 in to 28 in (55.8 cm to 71.2 cm); alternatively, from 24 in to 27 in (60.96 cm to 68.6 cm). In several aspects, each of the upper baffle 1310, the lower baffle 1330, and the bottom baffle 1350 have a height that is in a range of from about 2 in to about 10 in (5.08 cm to 25.4 cm); alternatively, from 4 in to 8 in (10.1 cm to 20.32 cm).

Figure 2A:
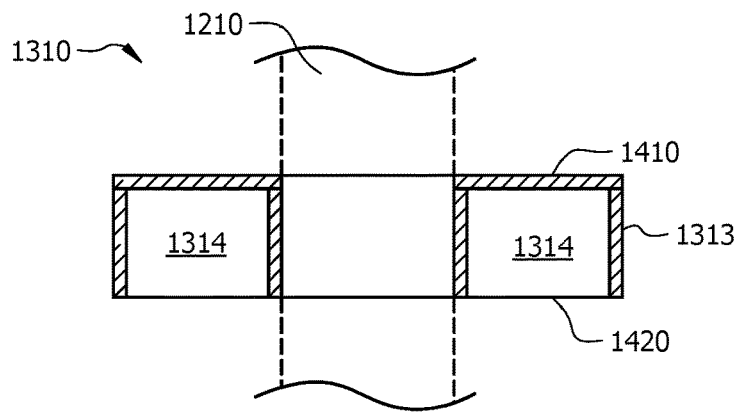
FIG. 2A illustrates a side cross section view of an upper baffle on the agitator assembly of in FIG. 1.
Figure 2B:
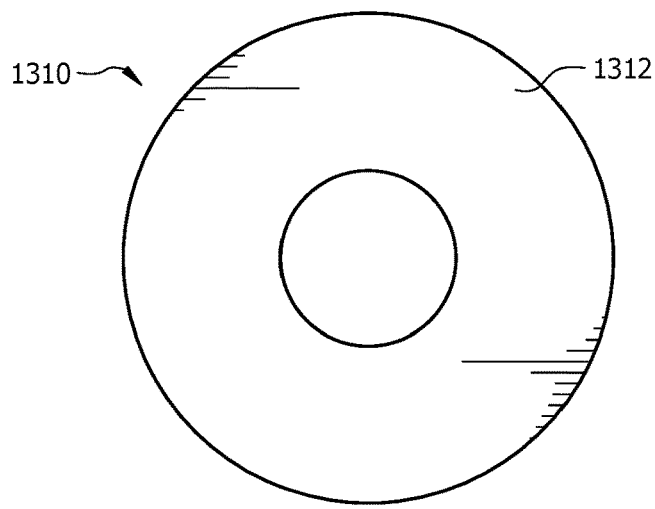
FIG. 2B illustrates a top view of the upper baffle of FIG. 2A.
Figure 2C:
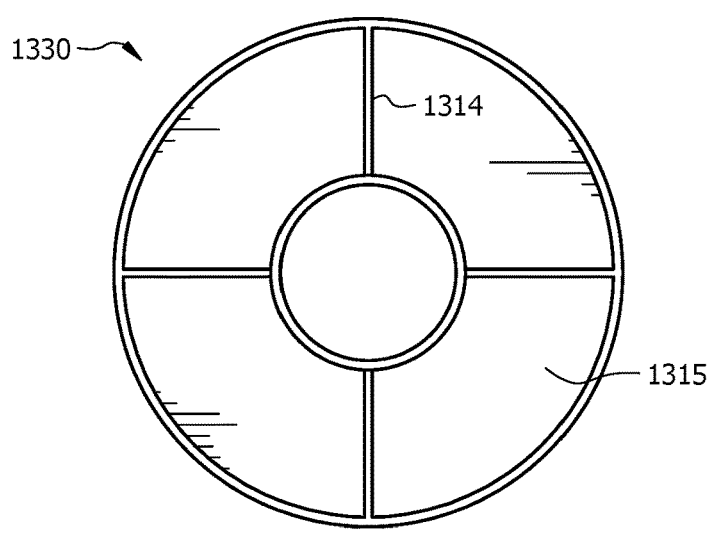
FIG. 2C illustrates a bottom view of the upper baffle of FIG. 2A and FIG. 2B.

FIG. 2A illustrates a side cross section view of an upper baffle 1310 on the agitator assembly 1200 of FIG. 1. FIG. 2B illustrates a top view of the upper baffle 1310 of FIG. 2A. FIG. 2C illustrates a bottom view of the upper baffle 1310 of FIG. 2A and FIG. 2B.

The upper baffle 1310 has a first side 1410 that faces upstream to the top piece 1110 of the housing 1100 and a second side 1420 that faces downstream to the lower baffle 1330. The shaft 1210 can be seen extending through the center of the upper baffle 1310.

The upper baffle 1310 can include an annular member 1312, a side wall 1313 connected to a perimeter of the annular member 1312, and paddles 1314 connected to the second side 1420 of the upper baffle 1310 (which is the bottom 1315 of the annular member 1312). The paddles 1314 can also be referred to as bottom-side paddles. In aspects, no paddles are connected to the first side 1410 of the upper baffle 1310. In some aspects, the paddles 1314 are connected to both the annular member 1312 and the side wall 1313; alternatively, the upper baffle 1310 does not include the side wall 1313 and the paddles 1314 are connected to the annular member 1312. In some embodiments, the upper baffle 1310 is free of features on the first side 1410 of the upper baffle 1310. Although the FIGS. 2A and 2B depict the first side 1410 of the upper baffle 1310 to be free of features, it also contemplated that the first side 1410 of the upper baffle 1310 include features such as one or more paddles.

Figure 3A:
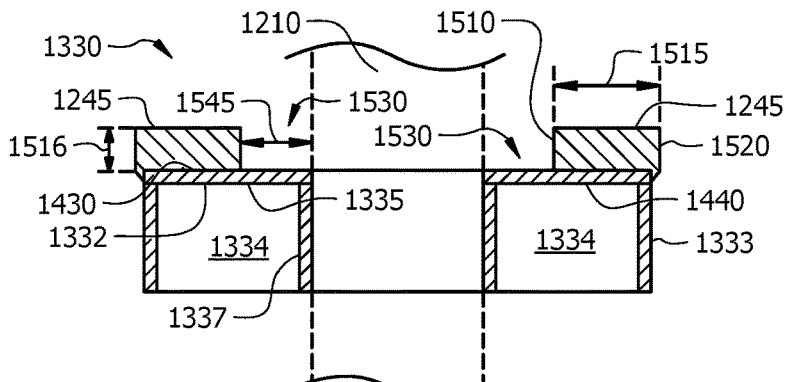
FIG. 3A illustrates a side cross section view of the lower baffle on the agitator assembly of in FIG. 1.
Figure 3B:
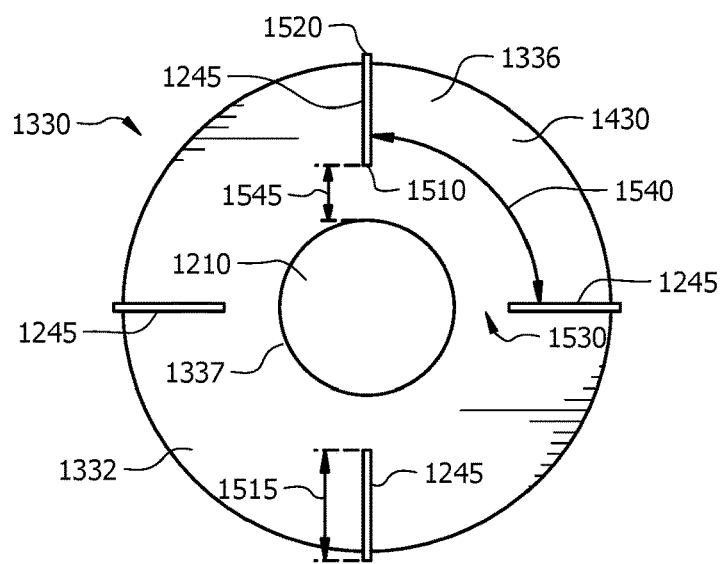
FIG. 3B illustrates a top view of the lower baffle of FIG. 3A.
Figure 3C:
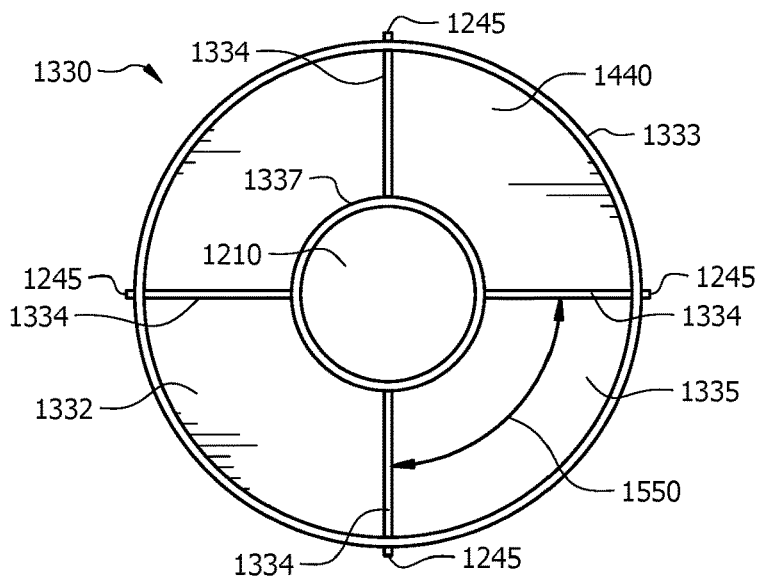
FIG. 3C illustrates a bottom view of the lower baffle of FIG. 3A and FIG. 3B.

FIG. 3A illustrates a side cross section view of the lower baffle 1330 on the agitator assembly 1200 of FIG. 1. FIG. 3B illustrates a top view of the lower baffle 1330 of FIG. 3A. FIG. 3C illustrates a bottom view of the lower baffle 1330 of FIG. 3A and FIG. 3B.

While lower baffle 1330 is described, it is to be understood that the bottom baffle 1350 and any other baffle below the upper baffle 1310 can include all features of the lower baffle 1330 as described for the lower baffle 1330 in FIGS. 3A to 3C. It is to be further understood that some embodiments of the autoclave reactor 1000 and process can have lower baffle 1330 embodied according to a first set of features described herein while another baffle (e.g., bottom baffle 1350) is embodied according to a different set of features; alternatively, the lower baffle 1330 and any other baffles positioned below the lower baffle 1330 can be identically configured.

The lower baffle 1330 has a first side 1430 that faces upstream to the upper baffle 1310 and a second side 1440 that faces downstream to the bottom baffle 1350. The shaft 1210 can be seen extending through the center of the lower baffle 1330.

The lower baffle 1330 can include an annular member 1332, a side wall 1333 connected to a perimeter of the annular member 1332, a first group of paddles 1245 connected to the first side 1430 of the lower baffle 1330 (which is the top 1336 of the annular member 1332), and a second group of paddles 1334 connected to the second side 1440 of the lower baffle 1330 (which is the bottom 1335 of the annular member 1332). The first group of paddles 1245 can be referred to as top-side paddles, and the second group of paddles 1334 can be referred to as bottom-side paddles. In some aspects, the second group of paddles 1334 are connected to both the annular member 1332 and the side wall 1333; alternatively, the lower baffle 1330 does not include the side wall 1333 and the second group of paddles 1334 are connected to the annular member 1332.

In several aspects, each of the first group of paddles 1245 of the lower baffle 1330 includes an inner edge 1510, an outer edge 1520, and a gap 1530 that is present between an outer surface of the shaft 1210 and the inner edge 1510 of each of the first group of paddles 1245. In aspects, each of the first group of paddles 1245 is the same dimension and size, and each gap 1530 is the same dimension. Dimensions for the paddles 1245 and gaps 1530 are discussed in more detail herein. In some aspects, there is no gap between the inner edge 1510 of each of the paddles 1245 and the shaft 1210.

Figure 4A:
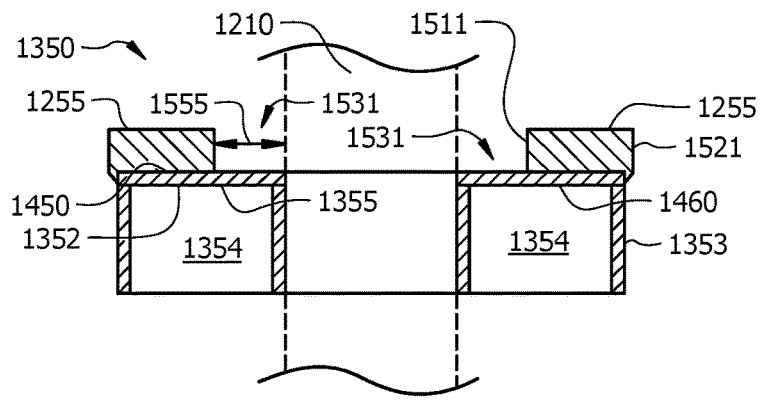
FIG. 4A illustrates a side cross section view of the bottom baffle on the agitator assembly of in FIG. 1.
Figure 4B:
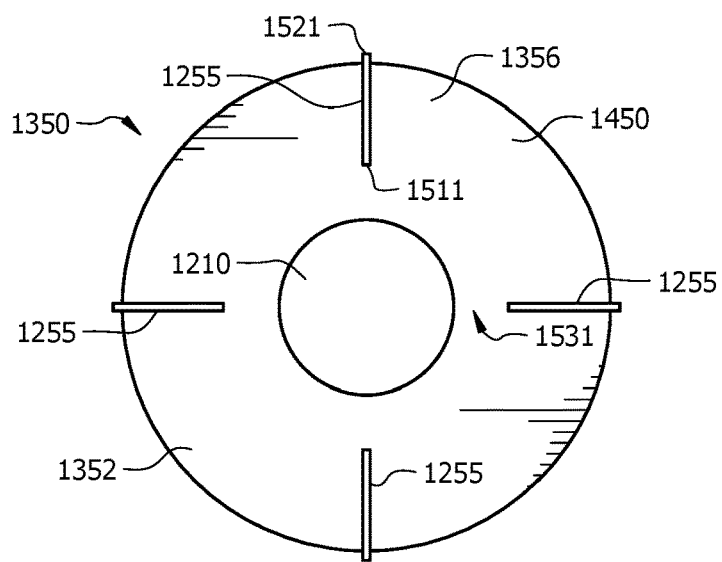
FIG. 4B illustrates a top view of the bottom baffle of FIG. 4A.
Figure 4C:
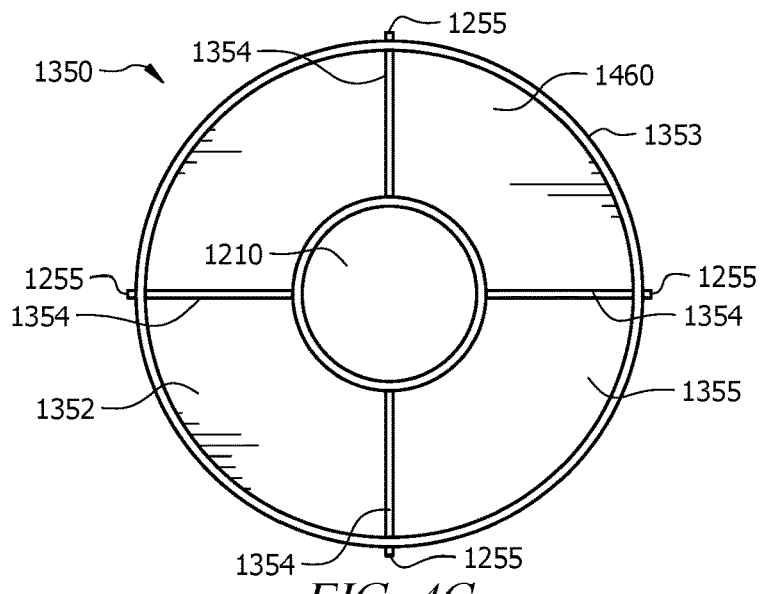
FIG. 4C illustrates a bottom view of the bottom baffle of FIG. 4A and FIG. 4B.

FIG. 4A illustrates a side cross section view of the bottom baffle 1350 on the agitator assembly 1200 of FIG. 1. FIG. 4B illustrates a top view of the bottom baffle 1350 of FIG. 4A. FIG. 4C illustrates a bottom view of the bottom baffle 1350 of FIG. 4A and FIG. 4B.

In some aspects, the bottom baffle 1350 has the same configuration as the lower baffle 1330.

The bottom baffle 1350 has a first side 1450 that faces upstream to the lower baffle 1330 and a second side 1460 that faces downstream to the bottom piece 1115 of the housing 1100. The shaft 1210 can be seen extending through the center of the bottom baffle 1350.

The bottom baffle 1350 can include an annular member 1352, a side wall 1353 connected to a perimeter of the annular member 1352, a first group of paddles 1255 connected to the first side 1450 of the bottom baffle 1350 (which is the top 1356 of the annular member 1352), and a second group of paddles 1354 connected to the second side 1460 of the bottom baffle 1350 (which is the bottom 1355 of the annular member 1352). The first group of paddles 1255 can be referred to as top-side paddles, and the second group of paddles 1354 can be referred to as bottom-side paddles. In some aspects, the second group of paddles 1354 are connected to both the annular member 1352 and the side wall 1353; alternatively, the bottom baffle 1350 does not include the side wall 1353 and the second group of paddles 1354 are connected to the annular member 1352.

In several aspects, each of the first sides 1410, 1430, and 1450 independently defines a plane that is perpendicular to the greatest dimension of the shaft 1210.

In several aspects, the first side 1410 is on a top side of the upper baffle 1310 and the second side 1420 is on a bottom side of the upper baffle 1310. In several aspects, the first side 1430 is on a top side of the lower baffle 1330 and the second side 1440 is on a bottom side of the lower baffle 1330. In several aspects, the second side 1420 (e.g., bottom side) of the upper baffle 1310 faces the first side 1430 (e.g., top side) of the lower baffle 1330. In several aspects, the first side 1450 is on a top side of the bottom baffle 1350 and the second side 1460 is on a bottom side of the bottom baffle 1350. In several aspects, the second side 1440 (e.g., bottom side) of the lower baffle 1330 faces the first side 1450 (e.g., top side) of the bottom baffle 1350.

In several aspects, each of the first group of paddles 1255 of the bottom baffle 1350 includes an inner edge 1511, an outer edge 1521, and a gap 1531 that is present between an outer surface of the shaft 1210 and the inner edge 1511 of each of the first group of paddles 1255 of the bottom baffle 1350. In aspects, each of the first group of paddles 1255 is the same dimension and size, and each gap 1531 is the same dimension. Dimensions for the paddles 1255 and gaps 1531 can be the same as those discussed in more detail herein for paddles 1245 and gaps 1530. In some aspects, there is no gap between the inner edge 1511 of each of the paddles 1255 and the shaft 1210.

The first polymerization zone 1710, as shown in FIG. 1, is defined by the volume between the second side 1420 (e.g., bottom side) of the upper baffle 1310 and the first side 1430 (e.g., top side) of the lower baffle 1330. The polymerization zone 1720, as shown in FIG. 1, is defined by the volume between the second side 1440 (e.g., bottom side) of the lower baffle 1330 and the first side 1450 (e.g., top side) of the bottom baffle 1350.

In several aspects (not shown), one or more additional lower baffles can be connected to the shaft 1210 at a location below the lower baffle 1330. Each of the one or more additional lower baffles includes all features of the lower baffle 1330 as described herein. One or more additional polymerization zones can be defined for each of the one or more additional lower baffles.

In additional aspects, one or more additional pluralities of axial paddles can be connected to the shaft 1210 below the upper baffle 1310 at a location in the first polymerization zone 1710. In additional aspects, one or more additional pluralities of axial paddles can be connected to the shaft 1210 below the lower baffle 1330 at a location in the polymerization zone 1720.

Referring back to FIG. 3A, a side cross-sectional view of the lower baffle 1330 is depicted with a partial view of the shaft 1210 in dashed lines to illustrate the gap 1530. Similarly, FIG. 4A depicts a side cross-sectional view of the bottom baffle 1350 with a partial view of the shaft 1210 in dashed lines to illustrate the gap 1531. For ease of description, the features are further described below with respect to the lower baffle 1330. The description also applies to the bottom baffle 1350, or any other baffle disposed below the upper baffle 1310.

The paddles 1245 and 1334 will be referred to as top-side paddles 1245 and bottom-side paddles 1334 for purposes of description. The annular member 1332 can be seen connected to the side wall 1333 and to an inner wall 1337 of the lower baffle 1330. Two of the bottom-side paddles 1334 can be seen. The bottom-side paddles 1334 extend between the side wall 1333 and the inner wall 1337. Each paddle 1334 is connected to the bottom 1335 of the annular member 1332, to the side wall 1333, to the inner wall 1337, or combinations thereof.

In several aspects, each top-side paddle 1245 can be connected to the first side 1430 of the lower baffle 1330. In several aspects, each top-side paddle 1245 extends in a direction perpendicular to a plane of the first side 1430. In several aspects, some of the paddles 1245 extend in a direction that is not perpendicular to the plane of the first side 1430, such as at an angle with respect to the plane of the first side 1430 that is less than 90°.

The gap 1530 includes a radial length 1545 defined by the distance that is between the inner edge 1510 of a top-side paddle 1245 and the outer surface of the shaft 1210. In several aspects, the radial length 1545 is in a range of from about 1 in to about 10 in (2.54 cm to 25.4 cm); alternatively, from 2 in to 4 in (5.08 cm to 10.16 cm); alternatively, from 2.5 in to 3.5 in (6.35 cm to 8.89 cm). In several aspects, the radial length 1545 is about 2.50, 2.60, 2.70, 2.80, 2.85, 2.90, 2.95, 3.00, 3.05, 3.10, 3.20, 3.30, 3.40, or 3.50 in (6.35, 6.60, 6.86, 7.11, 7.24, 7.37, 7.49, 7.62, 7.75, 7.87, 8.13, 8.38, 8.64, or 8.89 cm), or a value between any two of the foregoing. In several aspects, the gap 1531 of the bottom baffle 1350 has the same or different radial length 1555 relative to the radial length 1545 of the gap 1530 of the lower baffle 1330. In several aspects, each of the gaps 1530 and 1531 have different or the same radial lengths 1545 and 1555 relative to one another.

The paddles 1245 can have a radial length 1515 defined by the distance between the inner edge 1510 and an outer edge 1520 of the paddles 1245. In several aspects, the radial length 1515 is in a range of from about 1 to about 20 in (2.54 to 50.8 cm); alternatively, from 2 to 8 in (5.08 to 20.32 cm); alternatively, from 4.5 to 5.5 in (11.43 to 13.97 cm). In several aspects, the radial length 1515 is about 4.0, 4.1, 4.2, 4.3, 4.4, 4.5, 4.6, 4.7, 4.8, 4.85, 4.9, 4.95, 5, 5.05, 5.1, 5.15, 5.2, 5.3, 5.4, 5.5, 5.6, 5.7, 5.8, 5.9, or 6.0 in (10.16, 10.41, 10.67, 10.92, 11.18, 11.43, 11.68, 11.94, 12.19, 12.32, 12.45, 12.57, 12.70, 12.83, 12.95, 13.08, 13.21, 13.46, 13.72, 13.97, 14.22, 14.48, 14.73, 14.99, or 15.24 cm), or a value between any two of the foregoing.

The paddles 1245 can have a height 1516 in a range of from about 0.3 to about 6 in (0.76 to 15.24 cm); alternatively, from 0.5 to 4 in (1.27 cm to 10.16 cm); alternatively, from 1 to 3 in (2.54 to 7.62 cm); alternatively, from 1.5 to 3 in (3.81 to 7.62 cm); alternatively, from 2 to 3 in (5.08 to 7.62 cm). In several aspects, the height 1516 is about 1, 1.1, 1.2, 1.3, 1.4, 1.5, 1.6, 1.7, 1.8, 1.85, 1.9, 1.95, 2, 2.05, 2.1, 2.15, 2.2, 2.3, 2.4, 2.5, 2.6, 2.7, 2.8, 2.9, or 3.0 in (2.54, 2.79, 3.05, 3.30, 3.56, 3.81, 4.06, 4.32, 4.57, 4.70, 4.83, 4.95, 5.08, 5.21, 5.33, 5.46, 5.59, 5.84, 6.10, 6.35, 6.60, 6.86, 7.11, 7.37, 7.62 cm), or a value between any two of the foregoing.

The term "$R_L$" is a ratio of radial length 1545 of the gap 1530 to the radial length 1515 of the paddles 1245. In several aspects, $R_L$ is in a range of 0.1 to 5; alternatively, from 0.3 to 3; alternatively, from 0.5 to 1.5. In several aspects, $R_L$ is about 0.1, 0.3, 0.35, 0.4, 0.45, 0.5, 0.55, 0.6, 0.65, 0.7, 0.75, 0.8, 0.9, 1, 1.1, 1.2, 1.3, 1.35, 1.4, 1.45, 1.5, 1.55, 1.6, 1.65, 1.7, 1.8, 1.9, or a value between any two of the foregoing.

In some aspects, the paddles 1245 can be configured such that the outer edge 1520 extends radially outwardly further than the side wall 1333 of the lower baffle 1330. For example, the outer edge 1520 can extend 0.1, 0.2, 0.3, 0.4, 0.5, 0.6, 0.7, 0.8, 0.9, or 1.0 cm radially beyond the side wall 1333.

Referring back to FIG. 3B, a top view of the lower baffle 1330 is shown. As can be seen, the lower baffle 1330 is connected to four top-side paddles 1245. In several aspects, the lower baffle 1330 is connected to from about 2 to about 10 top-side paddles 1245; alternatively, from 2 to 6. In several aspects, the lower baffle 1330 is connected to 2, 3, 4, 5, or 6 top-side paddles 1245.

In aspects, the top-side paddles 1245 are equally spaced apart from one another. For example, two top-side paddles 1245 can be 180° apart, three top-side paddles 1245 can be 120° apart, four top-side paddles 1245 can be 90° apart, and so on. The term "circumferential distance 1540," as used herein, is a distance measured between a pair of adjacent top-side paddles 1245. In several aspects, the circumferential distance 1540 between each pair of top-side paddles 1245 is identical.

Referring back to FIG. 3C, a bottom view of the lower baffle 1330 is shown that includes a plurality of bottom-side paddles 1334, each of which independently provides additional surface area for moving, mixing, and agitating the reaction medium within the housing 1100. In several aspects, each bottom-side paddle 1334 can be connected to the second side 1440 of the lower baffle 1330, the bottom 1335 of the annular member 1332, to the side wall 1333, to the inner wall 1337, or combinations thereof. In several aspects, each bottom-side paddle 1334 extends in a direction perpendicular to the plane of the second side 1440 of the lower baffle 1330. In several aspects, some of the bottom-side paddles 1334 extend in a direction that is not perpendicular to the plane of the second side 1440, such as at an angle with respect to the plane of the second side 1440 that is less than 90°. In several aspects, each bottom-side paddle 1334 has a length defined from the side wall 1333 to the inner wall 1337 of the lower baffle 1330.

In aspects, the bottom-side paddles 1334 are equally spaced apart from one another. For example, two bottom-side paddles 1334 can be 180° apart, three bottom-side paddles 1334 can be 120° apart, four bottom-side paddles 1334 can be 90° apart, and so on. The term "circumferential distance 1550," as used herein, is a distance measured between a pair of adjacent bottom-side paddles 1334. In several aspects, the circumferential distance 1550 between each pair of bottom-side paddles 1334 is identical.

Figure 5:
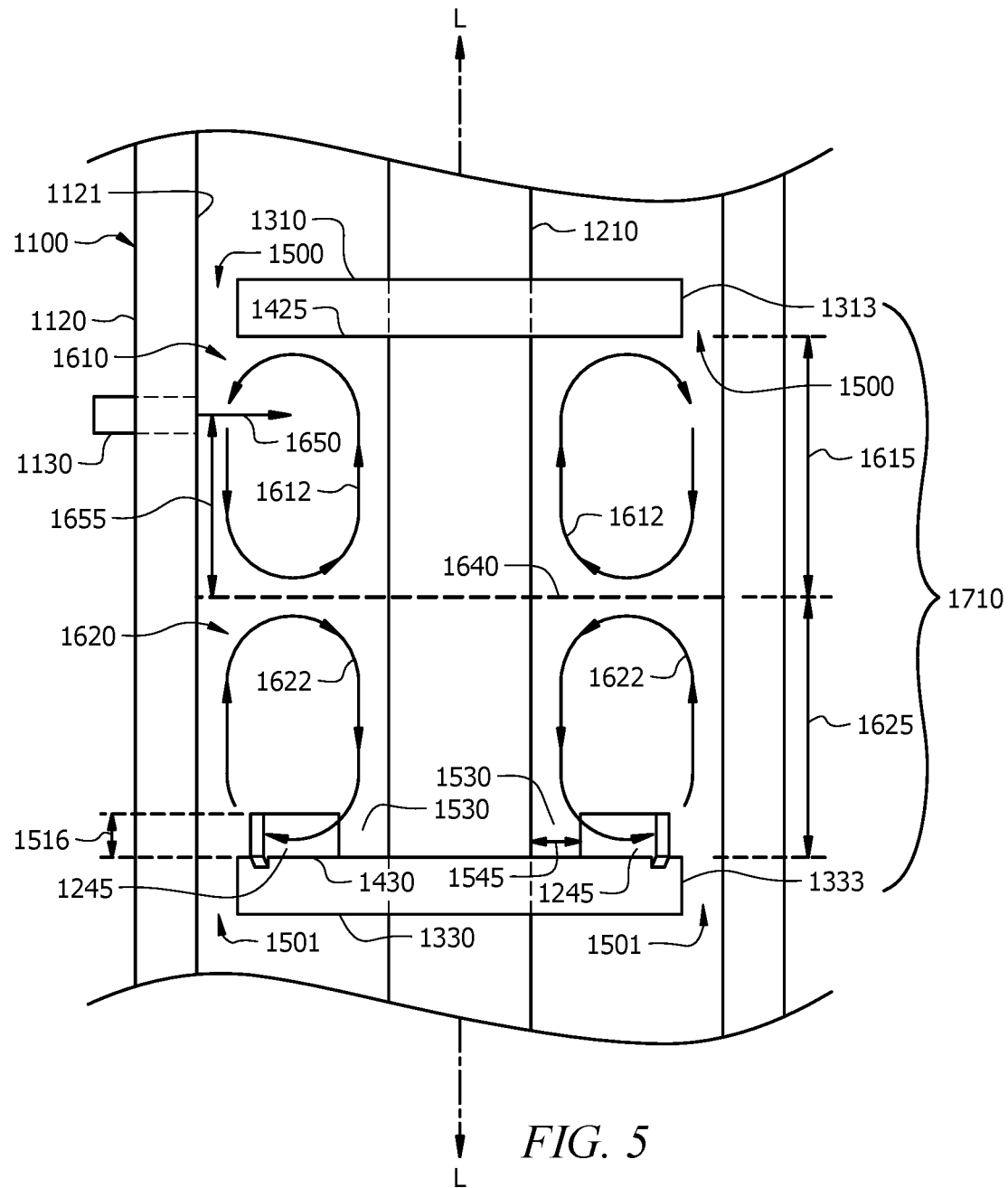
FIG. 5 illustrates a side view of the first polymerization zone between the upper baffle and lower baffle in the autoclave reactor of FIG. 1.

FIG. 5 illustrates a side view of the polymerization zone 1710 between the upper baffle 1310 and lower baffle 1330 in the autoclave reactor 1000 of FIG. 1.

The reaction medium moves downstream through the polymerization zone 1700 (see FIG. 1) and into the polymerization zone 1710. Rotation of the upper baffle 1310, the lower baffle 1330, the bottom-side paddles contained in the upper baffle 1310, and the top-side paddles 1245 of the lower baffle 1330 creates a first mixing current 1612 that defines a first mixing zone 1610, a second mixing current 1622 that defines a second mixing zone 1620, and interface 1640 between the first mixing current 1612 and the second mixing current 1622. In several aspects, the first mixing zone 1610, the first mixing current 1612, the second mixing zone 1620, and the second mixing current 1622 are created by the rotation of the upper baffle 1310, the rotation of the bottom-side paddles 1314 (see FIG. 2C) of the upper baffle 1310, the rotation of the lower baffle 1330, the rotation of top-side paddles 1245 of the lower baffle 1330, or any combination of the foregoing.

In several aspects, the first mixing zone 1610 is located above (e.g., upstream of) the second mixing zone 1620. It has been found that height 1516 values for the paddles 1245 that are greater than 1.5 in (greater than 3.81 cm) provide better mixing in the second mixing zone 1620 than height 1516 values for the paddles 1245 that are less than or equal to 1.5 in (less than or equal to than 3.81 cm).

In several aspects, a reaction component inlet 1130 is located in the vessel body 1120 of the housing 1100 at a location below the bottom 1425 of the upper baffle 1310. A reaction component stream 1650 enters the polymerization zone 1710 through the reaction component inlet 1130. The direction of introduction of the reaction component stream 1650 is at an angle (e.g., 1° to 89°) with respect to the plane of the interface 1640. Alternatively, the direction of introduction of the reaction component stream 1650 is perpendicular to the plane of the interface 1640; additionally or alternatively, the direction of introduction of the reaction component stream 1650 is above and parallel to the plane of the interface 1640.

The interface 1640 is defined between a lower boundary of the first mixing current 1612 and an upper boundary of the second mixing current 1622. In several aspects, the interface 1640 is defined where the first mixing current 1612 is near the second mixing current 1622, where the currents 1612 and 1622 flow in opposing axial directions near the interface 1640. That is, in aspects the direction of the first mixing current 1612 is opposite of, and complementary to, the direction of the second mixing current 1622. In several aspects, the interface 1640 is located where the first mixing current 1612 meets the second mixing current 1622.

In aspects, the interface 1640 also functions as the transfer plane, region, or location for reaction components from the first mixing zone 1610 to the second mixing zone 1620, and vice-versa, when the autoclave reactor is in operation. Recalling that flow of the reaction medium is from top to bottom in the autoclave reactor 1000, the reaction medium enters the polymerization zone 1710 through a space 1500 between the side wall 1313 of the upper baffle 1310 and the inner wall 1121 of the vessel body 1120 of the housing 1100, and leaves the polymerization zone 1710 through a space 1501 between the side wall 1333 of the lower baffle 1330 and the inner wall 1121 of the vessel body 1120 of the housing 1100. The reaction components flow through space 1500 into the mixing zone 1610, where the reaction components introduced through space 1500 are mixed with reaction components introduced in reaction component stream 1650. The reaction components circulate and mix in the first mixing zone 1610 by force of the first mixing current 1612, and some of the reaction components flow from the first mixing zone 1610 to the second mixing zone 1620 via the interface 1640. In the second mixing zone 1620, the reaction components circulate and mix in the second mixing zone 1620 by force of the second mixing current 1622, and some of the some of the reaction components flow from the second mixing zone 1620 and out of the polymerization zone 1710 via the space 1501. The mixed reaction components can flow through the space 1501 and into another polymerization zone 1720 that is downstream of polymerization zone 1710 via the space 1501.

Spaces 1500 and 1501 can have a radial length of 0.25 to 1 inch (0.635 to 2.54 cm), for example.

In several aspects, the first mixing zone 1610 is located above (e.g., upstream of) the interface 1640. In several aspects, the second mixing zone 1620 is located below (e.g., downstream of) the interface 1640.

The first mixing zone 1610 includes a height 1615 defined as a distance between a bottom 1425 of the upper baffle 1310 and the interface 1640. In several aspects, the height 1615 is related to the size of the gap 1530 between top-side paddles 1245 and the shaft 1210. In several aspects, the height 1615 is in a range of from about 5 to about 60 in (12.70 to 152.4 cm).

In aspects, the interface 1640 is offset from the reaction component inlet 1130. "Offset" as used herein refers to a distance or inlet offset height 1655 between a longitudinal axis of the reaction component inlet 1130 and the interface 1640. In several aspects, an "entry point" is defined as a location where the reaction component stream 1650 enters the polymerization zone 1710 through the reaction component inlet 1130. In several aspects, the inlet offset height 1655 is a distance between the entry point and the interface 1640.

The term "$R_{IO}$" is a ratio of the inlet offset height 1655 to the height 1615 of the first mixing zone 1610. In several aspects, $R_{IO}$ has a value greater than 0 and less than 1. In several aspects, $R_{IO}$ is in a range of about 0.1 to about 0.99; alternatively, 0.5 to 0.95; alternatively, 0.6 to 0.9. In several aspects, $R_{IO}$ is about 0.5, 0.55, 0.6, 0.65, 0.7, 0.75, 0.8, 0.85, 0.9, 0.95, or a value between any two of the foregoing.

In several aspects, the height 1615 of the first mixing zone 1610 varies in direct proportion to the radial length 1545 of the gap 1530.

The second mixing zone 1620 includes a height 1625. In several aspects, the height 1625 is a distance between the first side 1430 of the lower baffle 1330 and the interface 1640. In several aspects, the height 1625 is controlled by the rotation speed of the shaft 1210. In several aspects, the height 1625 is in a range of from about 5 in to about 60 in (12.70 to 152.4 cm).

The term "RH" is a ratio of the height 1615 of the first mixing zone 1610 to the height 1516 of the top-side paddle 1245. In several aspects, RH is in a range of about 10 to about 30; alternatively, 10 to 25; alternatively, 11 to 25; alternatively, 12 to 24; alternatively, 13 to 23. In several aspects, RH is about 13, 14, 15, 16, 16.5, 17, 17.2, 17.4, 17.6, 17.8, 18, 18.2, 18.4, 18.6, 18.8, 19, 19.5, 20, 21, 22, 23, or a value between any two of the foregoing.

The reaction medium moves from the polymerization zone 1710 into and through the polymerization zone 1720, as described herein. In several aspects, the polymerization zone 1720 includes all the features of the polymerization zone 1710, as described in relation to FIG. 5. For example, the polymerization zone 1720 includes a first mixing current that defines a first mixing zone, a second mixing current that defines a second mixing zone, and an interface between the first mixing current and the second mixing current. Other polymerization zones in additional embodiments between two baffles as described for FIG. 5 can have the same mixing current and mixing zone configurations.

Introduction of the reaction component stream 1650 into the first mixing zone 1610 created by the first mixing current 1612 above the interface 1640 improves mixing of reaction components in the polymerization zone 1710 because reaction components introduced in stream 1650 mix in the first mixing zone 1610 and then are transported by the first mixing current 1612 to the second mixing zone 1620 via the interface 1640 for additional mixing in the polymerization zone 1710. Thus, each polymerization zone 1710 having two mixing zones 1610 and 1620 improves mixing over an autoclave reactor having a single mixing zone in a polymerization zone 1710. Put another way, utilizing paddles 1245 to create an interface 1640 and two mixing zones 1610 and 1620 in a polymerization zone 1710 defined as the volume between two baffles 1310 and 1330 improves mixing of reaction components in the polymerization zone 1710 and reduces likelihood of monomer decomposition compared to an autoclave reactor that does not have paddles 1245 that create an interface 1640 between two mixing zones 1610 and 1620.

Additionally, locating the direction of introduction of the reaction component stream 1650 above the interface 1640, and in some aspects parallel to a plane of the interface 1640, further improves mixing of reaction components in the polymerization zone 1710. Put another way, utilizing a gap 1530 between paddles 1245 and the shaft 1210 to increase the distance between the interface 1640 and the reaction component stream 1650 increases the size of the first mixing zone 1610 relative to the second mixing zone 1620 and further improves mixing in the first and second mixing zone 1610 and 1620 of the polymerization zone 1710, which further reduces likelihood of monomer decomposition compared to an autoclave reactor that does not have paddles 1245 and a gap 1530 between the paddles 1245 and the shaft 1210.

A process disclosed herein can include mixing a reaction medium in the autoclave reactor 1000 with the rotating shaft 1210 that has a first baffle (e.g., the upper baffle 1310) and a second baffle (e.g., the lower baffle 1330) coupled to the rotating shaft 1210 such that a volume of the autoclave reactor 1000 that is between the first baffle and the second baffle defines the polymerization zone 1710; during mixing, creating in the polymerization zone 1710 the first mixing current 1612, the second mixing current 1622, and the interface 1640 located between the first mixing current 1612 and the second mixing current 1622; and introducing a reaction component into the polymerization zone 1710 via an inlet 1130 of the autoclave reactor 1000 that is fluidly coupled to the polymerization zone 1710, where the interface 1640 is offset from the inlet 1130. The process can further include polymerizing an olefin monomer and optionally an olefin comonomer in the polymerization zone 1710 to produce a polyolefin. The autoclave reactor 1000 in the process can have any configuration described herein, and the reaction components and polyolefin can be any embodiment described herein.

Additional Description

Aspects of processes and systems have been described. The following are non-limiting, specific aspects in accordance with the present disclosure:

Aspect 1. A process comprising: mixing a reaction medium in an autoclave reactor with a rotating shaft, wherein the rotating shaft has a first baffle and a second baffle coupled to the rotating shaft, wherein a volume of the autoclave reactor that is between the first baffle and the second baffle forms a polymerization zone, wherein each of a first plurality of paddles is connected to the first baffle, wherein each of a second plurality of paddles is connected to the second baffle; during mixing, creating in the polymerization zone a first mixing current, a second mixing current, and an interface located between the first mixing current and the second mixing current; and introducing a reaction component into the polymerization zone via an inlet of the autoclave reactor that is fluidly coupled to the polymerization zone, wherein the interface is offset from the inlet.

Aspect 2. The process of Aspect 1, wherein the first mixing current defines a first mixing zone, and the second mixing current defines a second mixing zone, wherein the first mixing zone is above the interface and the second mixing zone is below the interface.

Aspect 3. The process of Aspect 1 or 2, wherein a first group of the second plurality of paddles is on a first side of the second baffle.

Aspect 4. The process of any of Aspects 1 to 3, wherein a second group of the second plurality of paddles is on a second side of the second baffle, wherein each of the first plurality of paddles is on a first side of the first baffle.

Aspect 5. The process of Aspect 4, wherein the first group of the second plurality of paddles are top-side paddles, wherein the second group of the second plurality of paddles are bottom-side paddles.

Aspect 6. The process of any of Aspects 3 to 5, wherein a gap is present between each of the first group of the second plurality of paddles and the rotating shaft.

Aspect 7. The process of Aspect 6, wherein a ratio of a radial length of the gap to a radial length of each of the first group of the second plurality of paddles is in a range of 0.5 to 1.5.

Aspect 8. The process of any of Aspects 3 to 7, wherein a ratio of a height of the polymerization zone to a height of each of the first group of the second plurality of paddles is in a range of 10 to 30.

Aspect 9. The process of any of Aspects 3 to 8, wherein the first group of the second plurality of paddles are equally spaced apart from one another.

Aspect 10. The process of any of Aspects 3 to 9, wherein each of the first group of the second plurality of paddles extends in a direction that is perpendicular to a plane of the first side of the second baffle.

Aspect 11. The process of any of Aspects 1 to 10, wherein the reaction medium comprises an olefin monomer, wherein the reaction component comprises an initiator, wherein the initiator comprises an organic peroxide.

Aspect 12. An autoclave reactor comprising: a housing having a first inlet configured to receive an olefin monomer, a second inlet configured to receive an initiator, and an outlet configured to output a reaction medium comprising a polyolefin; and an agitator assembly contained within the housing, wherein the agitator assembly comprises: a motor; a shaft coupled to the motor; a first baffle coupled to the shaft; a second baffle coupled to the shaft below the first baffle so as to form a polymerization zone between the first baffle and the second baffle; a first plurality of paddles connected to the first baffle; and a second plurality of paddles connected to the second baffle, wherein a first group of the second plurality of paddles is positioned on a first side of the second baffle; wherein the second inlet is positioned on a side of the housing and has a feed point to the polymerization zone that is between the first baffle and the second baffle.

Aspect 13. The autoclave reactor of Aspect 12, wherein a second group of the second plurality of paddles is on a bottom side of the second baffle.

Aspect 14. The autoclave reactor of Aspect 12 or 13, wherein each of the first plurality of paddles is on a bottom side of the first baffle.

Aspect 15. The autoclave reactor of any of Aspects 12 to 14, wherein a gap is present between each of the first group of the second plurality of paddles and the shaft.

Aspect 16. The autoclave reactor of Aspect 15, wherein a ratio of a radial length of the gap to a radial length of each of the first group of the second plurality of paddles is in a range of 0.5 to 1.5.

Aspect 17. The autoclave reactor of any of Aspects 12 to 16, wherein a ratio of a height of the polymerization zone to a height of each of the first group of the second plurality of paddles is in a range of 10 to 30.

Aspect 18. The autoclave reactor of any of Aspects 12 to 17, wherein the first group of the second plurality of paddles are equally spaced apart from one another.

Aspect 19. The autoclave reactor of any of Aspects 12 to 18, wherein each of the first group of the second plurality of paddles extends in a direction that is perpendicular to a plane of the first side of the second baffle.

Aspect 20. The autoclave reactor of any of Aspects 12 to 19, wherein the first group of the second plurality of paddles comprises from 2 to 6 paddles.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the detailed description of the present disclosure. The disclosures of all patents, patent applications, and publications cited herein are hereby incorporated by reference.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, processes and steps described in the specification. As one of ordinary skill in the art will readily appreciate from the disclosure, processes, machines, manufacture, compositions of matter, means, processes, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, processes, or steps.

What is claimed is:

1. A process comprising:
    mixing a reaction medium in an autoclave reactor with a rotating shaft, wherein the rotating shaft has a first baffle and a second baffle coupled to the rotating shaft, wherein a volume of the autoclave reactor that is between the first baffle and the second baffle forms a polymerization zone, wherein each of a first plurality of paddles is connected to the first baffle, wherein each of a second plurality of paddles is connected to the second baffle;
    during mixing, creating in the polymerization zone a first mixing current, a second mixing current, and an interface located between the first mixing current and the second mixing current; and
    introducing a reaction component into the polymerization zone via an inlet of the autoclave reactor that is fluidly coupled to the polymerization zone, wherein the interface is offset from the inlet.

2. The process of claim 1, wherein the first mixing current defines a first mixing zone, and the second mixing current defines a second mixing zone, wherein the first mixing zone is above the interface and the second mixing zone is below the interface.

3. The process of claim 1, wherein a first group of the second plurality of paddles is on a first side of the second baffle.

4. The process of claim 3, wherein a second group of the second plurality of paddles is on a second side of the second baffle, wherein each of the first plurality of paddles is on a first side of the first baffle.

5. The process of claim 4, wherein the first group of the second plurality of paddles are top-side paddles, wherein the second group of the second plurality of paddles are bottom-side paddles.

6. The process of claim 3, wherein a gap is present between each of the first group of the second plurality of paddles and the rotating shaft.

7. The process of claim 6, wherein a ratio of a radial length of the gap to a radial length of each of the first group of the second plurality of paddles is in a range of 0.5 to 1.5.

8. The process of claim 3, wherein a ratio of a height of the polymerization zone to a height of each of the first group of the second plurality of paddles is in a range of 10 to 30.

9. The process of claim 3, wherein the first group of the second plurality of paddles are equally spaced apart from one another.

10. The process of claim 3, wherein each of the first group of the second plurality of paddles extends in a direction that is perpendicular to a plane of the first side of the second baffle.

11. The process of claim 1, wherein the reaction medium comprises an olefin monomer, wherein the reaction component comprises an initiator, wherein the initiator comprises an organic peroxide.

12. An autoclave reactor comprising:
a housing having a first inlet configured to receive an olefin monomer, a second inlet configured to receive an initiator, and an outlet configured to output a reaction medium comprising a polyolefin; and
an agitator assembly contained within the housing, wherein the agitator assembly comprises:
a motor;
a shaft coupled to the motor;
a first baffle coupled to the shaft;
a second baffle coupled to the shaft below the first baffle so as to form a polymerization zone between the first baffle and the second baffle;
a first plurality of paddles connected to the first baffle; and
a second plurality of paddles connected to the second baffle, wherein a first group of the second plurality of paddles is positioned on a first side of the second baffle;
wherein the second inlet is positioned on a side of the housing and has a feed point to the polymerization zone that is between the first baffle and the second baffle.

13. The autoclave reactor of claim 12, wherein a second group of the second plurality of paddles is on a bottom side of the second baffle.

14. The autoclave reactor of claim 12, wherein each of the first plurality of paddles is on a bottom side of the first baffle.

15. The autoclave reactor of claim 12, wherein a gap is present between each of the first group of the second plurality of paddles and the shaft.

16. The autoclave reactor of claim 15, wherein a ratio of a radial length of the gap to a radial length of each of the first group of the second plurality of paddles is in a range of 0.5 to 1.5.

17. The autoclave reactor of claim 12, wherein a ratio of a height of the polymerization zone to a height of each of the first group of the second plurality of paddles is in a range of 10 to 30.

18. The autoclave reactor of claim 12, wherein the first group of the second plurality of paddles are equally spaced apart from one another.

19. The autoclave reactor of claim 12, wherein each of the first group of the second plurality of paddles extends in a direction that is perpendicular to a plane of the first side of the second baffle.

20. The autoclave reactor of claim 12, wherein the first group of the second plurality of paddles comprises from 2 to 6 paddles.

* * * * *